United States Patent [19]

Neubauer et al.

[11] Patent Number: 5,458,474
[45] Date of Patent: Oct. 17, 1995

[54] CONTINUOUS SYSTEM FOR PROCESSING SYNTHETIC THERMOPLASTIC MATERIALS

[75] Inventors: Anthony C. Neubauer, Piscataway; Theodore R. Blakeslee, III, Hillsborough, both of N.J.

[73] Assignee: Union Carbide Chemicals & Plastics Technology Corporation, Danbury, Conn.

[21] Appl. No.: 357,532

[22] Filed: Dec. 16, 1994

Related U.S. Application Data

[63] Continuation of Ser. No. 78,678, Jun. 16, 1993, abandoned.
[51] Int. Cl.⁶ ................................................. B29B 7/40
[52] U.S. Cl. .................... 425/202; 366/91; 425/205; 425/209; 425/382.3
[58] Field of Search ................................ 425/202, 208, 425/205, 209, 376.1, 382.3, 311; 366/73, 79, 90, 91; 417/205; 418/206; 422/135, 137

[56] References Cited

U.S. PATENT DOCUMENTS

| | | | |
|---|---|---|---|
| 3,486,192 | 12/1969 | Le Roy | 425/376.1 X |
| 4,032,391 | 6/1977 | Moked et al. | 418/206 X |
| 4,137,023 | 1/1979 | Moked et al. | 418/15 |
| 4,303,344 | 12/1981 | Muller | 366/91 X |
| 4,416,543 | 11/1983 | Brinkmann | 366/91 X |
| 4,448,737 | 5/1984 | Johnson | 425/205 X |
| 4,452,750 | 6/1984 | Handwerk et al. | 264/40.3 |
| 4,890,996 | 1/1990 | Shimizu | 425/205 X |
| 5,182,066 | 1/1993 | Marin | 425/205 X |

Primary Examiner—Richard L. Chiesa
Attorney, Agent, or Firm—P. W. Leuzzi

[57] ABSTRACT

A continuous pelletizing system for pelletizing synthetic thermoplastic materials which includes:

(1) a melter/mixer for at least partially melting and mixing synthetic thermoplastic material;

(2) a gear pump operatively associated with the melter/mixer for increasing pressurization of the melted synthetic thermoplastic material;

(3) an independently controlled dispersive mixer operatively associated with said gear pump or the melter/mixer which provides additional independent mixing of the melted synthetic thermoplastic material; and (4) a pelletizer operatively associated with the independently controlled dispersive mixer or the gear pump for forming pellets of synthetic material.

5 Claims, 2 Drawing Sheets

CONTINUOUS SYSTEM FOR PROCESSING SYNTHETIC THERMOPLASTIC MATERIALS

This application is a continuation of prior U.S. application Ser. No. 08/078,678 filing date Jun. 16, 1993, now abandoned.

FIELD OF THE INVENTION

The present invention relates to a novel continuous system for the processing of synthetic thermoplastics materials and more particularly to a pelletizing system for synthetic thermoplastic materials in which both the distributive (extensive) and/or dispersive (intensive) mixing performances of conventional continuous pelletizing systems are improved.

BACKGROUND OF THE INVENTION

As used herein, the term "extensive" or "distributive" mixing means the uniform distribution of particles within a matrix. Distributive mixing can cover the distribution of non-interacting filler particles.

The term "intensive" or "dispersive" mixing refers to the breaking down of gels or agglomerates.

Pelletizing systems generally provide the overall process by which various thermoplastic materials are altered in form, homogenized, mixed, alloyed and combined with additives. As a result, the thermoplastic materials undergo molecular alterations, often referred to as "tailoring". For most products, however, energy input to the resin is kept at a minimum to avoid this effect. Therefore, the pelletizing system must have the ability to control the amount of mixing and/or energy input to the thermoplastic material.

In general, there are two types of pelletizing systems, i.e., non-continuous batch-type and continuous type pelletizing systems.

A pelletizing system that uses a batch-type mixer such as a "Banbury" mixer (as compared to continuous mixers such as the Farrel "FCM") to melt and mix the thermoplastic material and an extruder for melt pressurization is referred to as a two-stage batch-type mixer/extruder pelletizing line.

Such systems have the ability to process a wide range of thermoplastic materials and products that have a wide variation in density, viscosity, etc., but have limited capacities. Further, the atmosphere surrounding the melting/mixing of the thermoplastic material cannot be easily controlled using standard and proven techniques. Therefore, they are of limited value for use in high-capacity pelletizing systems.

In the early stages of development of polymer processing equipment, continuous pelletizing systems had the melting, mixing and pressurization generation function combined in a single machine; this is commonly referred to as a single-stage pelletizing line. An example of such a system is the commonly used, single screw, plasticating extruder. Two-stage extruder/extruder pelletizing systems or tandem extruder pelletizing lines were also developed which included a separate extruder for melting and mixing and another extruder for melt pressurization and additional mixing.

Unfortunately, however, experience has demonstrated that the early continuous pelletizing systems significantly limit the ability to process a wide range of thermoplastic materials and products that have a wide variation in density, viscosity, etc. without extensive modification of the equipment. Typically, the maximum viscosity range that a given extruder can process acceptably is only 75:1 at best, based on melt index (MI). Accordingly, they are not acceptable for use in high-capacity pelletizing systems that must have the ability to process a wide range of thermoplastic materials and products that have a wide variation in density, viscosity etc.

More recently, pelletizing systems have been developed which include a separate mixer and a gear pump for melt pressurization which represent a typical two-stage pelletizing system. Merely as illustrative, U.S. Pat. Nos. 4,032,391 and 4,137,023 assigned to I. Moked et al., relate to a gear pump and a low energy pumping system (LEPSY) and suggest such combination of melter/mixer, such as Farrel continuous mixer (FCM) and such gear pump in an in-line processing system. More recently, according to U.S. Pat. No. 4,452,750 issued to Handwerk et al., there is disclosed an improvement in the operation of a melter/mixer-gear pump system for processing of synthetic thermoplastic materials, the improvement which comprises employing the pressure between the melter/mixer and the gear pump as the controlling parameter which affects, in a proportional relationship, the speed of the gear pump, the energy transmitted to and the consequent temperature of the materials passing through the reciter/mixer.

Although such systems are able to process a viscosity range, based on MI, of approximately 150:1 such systems however are not entirely satisfactory because in certain operations, polymerization reactors are able to produce 300,000:1 or greater viscosity range products. For example, in producing polyethylene in fluidized bed gas phase reactors, polyethylene resin is capable of being produced in large capacities such as in excess of 25,000 lb/hr with a MI range of 300,000:1 or greater.

Moreover, when utilizing conventional technologies for producing large quantities of synthetic thermoplastic resin, it has been found that a significant percentage of the resin is "not mixed" sufficiently as it is processed through the pelletizing system, i.e., the resin "bypasses" the high stress regions within the flow channels of the mixer. Thus, no appreciable dispersive or distributive mixing occurs.

In fact, computational studies have shown that up to 65% of the material can bypass the high stress regions in the mixer. Other studies have shown that a percentage of bypass as low as 5% will reduce film appearance rating (FAR) from +40 to −40. (The more positive the number, the better the rating.)

Attempts to obtain consistent and satisfactory mixing both intensive and extensive with typical, commercially available, twin screw mixers, both tangential counter-rotating and intermeshing co-rotating, have been futile. Extensive testing has also shown that mixers with multiple stages, such as the two stage "LCM" mixer manufactured by Kobe Steel, Ltd., Japan, and multistage long L/D ZSK mixers manufactured by Werner & Pfleiderer, Stuttgart, Germany (W&P), have yielded better, but still not entirely satisfactory, results.

Accordingly, an improved pelletizing system that ensures uniform mixing both intensive and extensive, while preventing and/or controlling "bypass," is required.

SUMMARY OF THE INVENTION

Broadly contemplated, the present invention provides a continuous pelletizing system for pelletizing synthetic thermoplastic materials which comprises:

(1) a melter/mixer for at least partially melting and mixing synthetic thermoplastic material, (2) a gear pump operatively associated with said melter/mixer for increasing pressurization of said melted synthetic thermoplastic material;

(3) an independently controlled secondary mixer operatively associated with said gear pump or said melter/mixer including means for providing additional independent mixing of said melted synthetic thermoplastic material and (4) a pelletizer operatively associated with said independently controlled secondary mixer or said gear pump for forming pellets of synthetic material.

In one embodiment of the invention the independently controlled secondary mixer is disposed upstream of the gear pump.

In another embodiment of the invention the independently controlled secondary mixer is disposed downstream of the gear pump.

DETAILED DESCRIPTION OF THE PREFERRED EMBODIMENTS

Melter/Mixer Gear Pump

Figure 1:
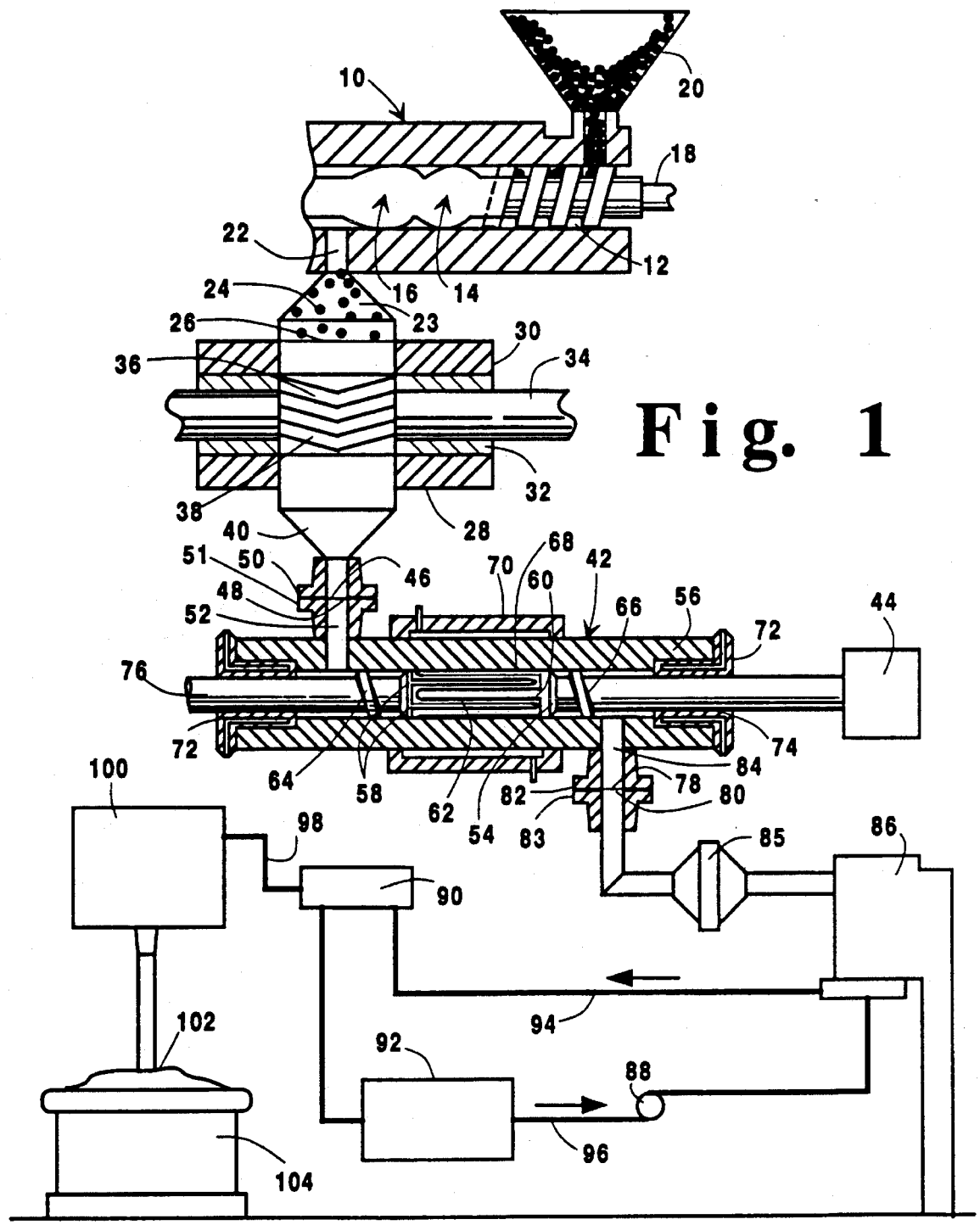
FIG. 1 is a schematic view, partly in section illustrating the melter/mixer, gear pump, and secondary mixer disposed downstream of the gear pump.

The type of melter/mixer and gear pump combination which can be employed according to the present invention is conventional in the art and is adapted to process a wide range of synthetic thermoplastic materials having a wide variation in density, viscosity, and other parameters. Merely as illustrative, the melter/mixer gear pump combination can be of the type which is available commercially from the Fartel Corporation, Ansonia, Conn., under their FCM designations. In addition, other sources include those manufactured by Kobe Steel, Kobe, Japan under their KCM and LCM models; Japan Steel Works, Hiroshima, Japan under models CMP and CMPX; Werner & Pfleiderer, Stuttgart, Germany under model ZSK.

A particularly preferred system is disclosed in U.S. Pat. No. 4,452,750 issued to Handwerk et al on Jun. 5, 1984.

The independently driven secondary mixer which can be employed according to the present invention is of the type which provides additional independent mixing of the synthetic thermoplastic material. Merely as illustrative the secondary mixer employed can be of the type disclosed in U.S. Pat. Nos. 2,753,595; 3,006,029; 3,486,192; 3,788,612; 3,788,614; 4,419,014 and 5,013,233. To provide for independent operation, the secondary mixer can be modified by conventional techniques to provide independent operation by a conventional motor means energized independently of the system.

In selecting a melter/mixer and gear pump combination for the system of the invention, it is to be noted that downstream equipment will affect the required discharge pressure of the gear pump while the pumping capacity of the gear pump, as well as the melter/mixer and downstream equipment, is determined by the external polymer inlet source. It is preferred that the melter/mixer, the gear pump and the secondary mixer should be closely coupled to insure economic operation and ease of operability.

It has been found that the two aspects of achieving "close coupling" are: minimizing the length of the conduit connections between the melter/mixer, the gear pump and secondary mixer and employing hydraulically (polymer) filled and pressurized communication between the melter/mixer, the gear pump and secondary mixer.

The system of the present invention can be carried out employing both single-stage compounding melter-mixers as well as two-stage compounding melter/mixers, with various thermoplastic polymer materials, such as high pressure and low pressure polyethylene. It has been found that processing and product quality advantages in the materials processed in accordance with the present inventions are as follows:

(a) Absence of Oxygen—It is to be pointed out that the effect of oxygen at treatment temperature in the process of the present invention results in oxidation of the synthetic thermoplastic polymer material being treated and produces all of the adverse effects well known to the art which are caused by such oxidation. Therefore, it must be noted that treatment in accordance with the present invention is advantageously conducted utilizing dose coupling throughout the entire system including the secondary mixer, from the point at the output end of any reactor employed for polymerization in the process, to the point of final handling of the synthetic thermoplastic polymer material at process temperatures.

Close coupling to the polymerization reactor outlet also enables a reduction in energy input to the melter-mixer due to the higher polymer temperature of the melter-mixer inlet which reduces the sensible thermal energy requirements of the polymer prior to its phase change from the solid state.

Accordingly, the system of the invention provides an oxygen-free, low residence time exposure of the resin from the reactor discharge through the final pelleting step. This is especially important for granular reactor resins because of their large surface area and porosity. Thus, potentially, the system can provide a pelleted resin with properties essentially the same as when emerging from the reactor vessel.

(b) Low Thermal Abuse—By virtue of using gear pump technology with its inherently low temperature increase to the polymer, the system operates at polymer temperatures significantly lower than if conventional screw extruders would be used for pumping. This further inhibits, along with the absence of oxygen, undesirable changes in resin properties.

(c) Controlled Energy Input—While in its standard operating mode, the system is intended to provide minimum energy input and effect no changes in the polymer, the system does have the capability of imparting additional energy to the polymer in a controlled fashion. Thus, the system has the flexibility to induce controlled changes to the reactor resin, when desired, by controlling the additional energy input in the melter-mixer-gear pump process.

As mentioned previously, the secondary mixer should also be closely coupled in the system.

The secondary mixer can be disposed upstream of the gear pump or alternatively downstream of the gear pump. The appropriate positioning would depend upon the operating characteristics of the melter/mixer, the type polymers being processed as well as other considerations.

Referring specifically to the embodiment of melter/mixer gear pump and secondary mixer in accordance with FIG. 1 of the drawings, melter/mixer 10 of the FCM type is employed having successive feed, melting and mixing sections or zones 12, 14 and 16, respectively. The driver screw power inlet means (through shaft 18) provides the energy for either single-screw or twin-screw melter/mixer operation. Gravitational feed hopper means 20 provides the thermoplastic material to be processed in whatever form desired and outlet means 22 passes the melted and mixed material 24 through any of a wide variety of conduit configurations to the inlet 26 of the gear pump.

Figure 2:
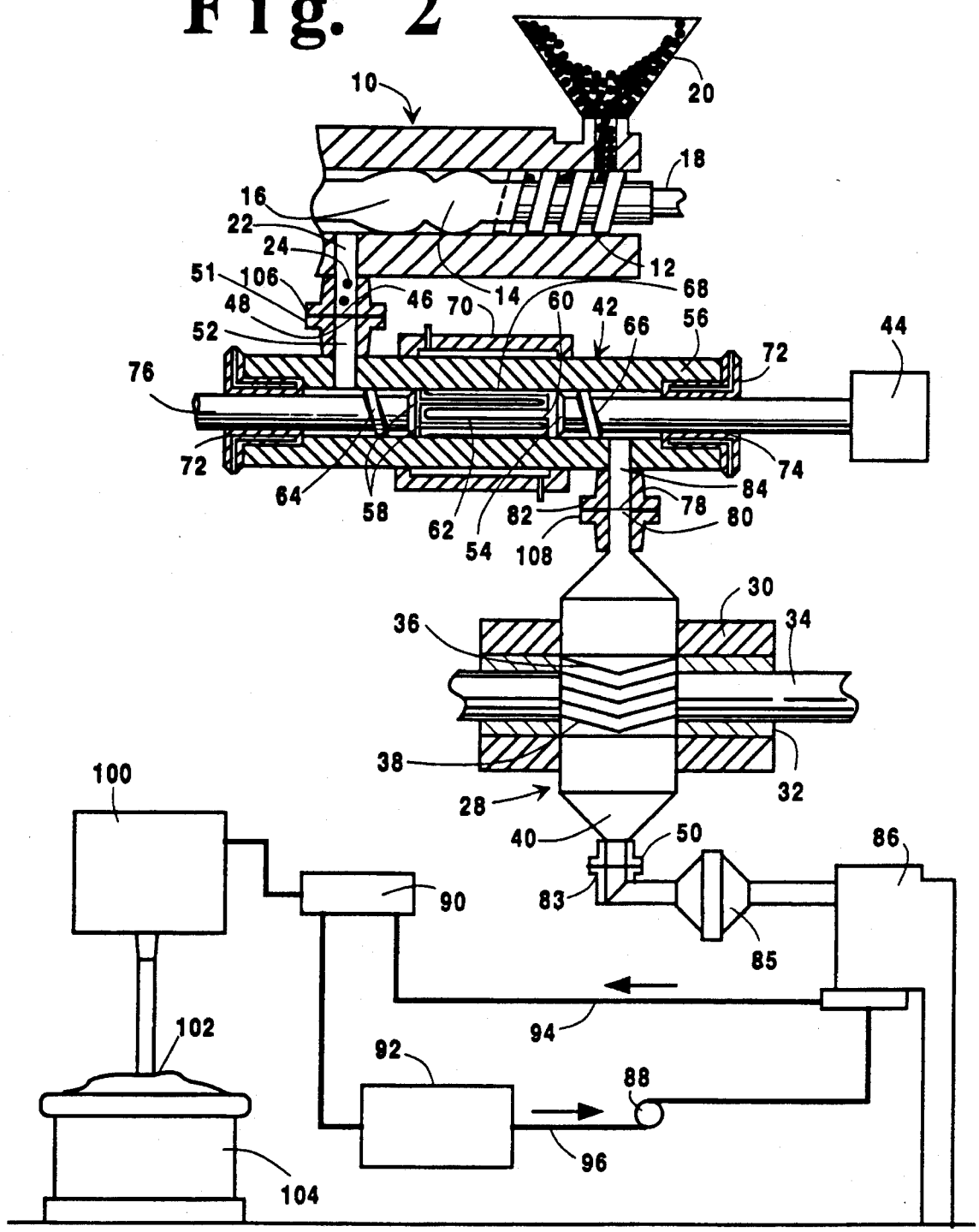
FIG. 2 is a schematic view partly in section and which is similar to FIG. 1 except that the secondary mixer is disposed upstream of the gear pump.

The melted, mixed thermoplastic material passes from exit of the melter/mixer through connecting conduit 23 to inlet conduit 26 of the gear pump 28. The gear pump is of the type described in U.S. Pat. No. 4,452,750, although the showing of elements in FIG. 1 of the instant drawings give a very schematic representation of the outer housing member 30, inner bearing sleeve member 32 and rotary drive shaft member 34. The gear member 36 and drive shaft member 34 are not shown in section, but are shown in elevational view. The gear member 36 can be one of a gear pump pair of counter-rotating intermeshing gears, preferably having herringbone teeth 38 which intermesh with the teeth of the opposite gear 36 (not shown). As shown in FIGS. 2 and 4 of U.S. Pat. Nos. 4,032,391 and 4,137,023 the outer walls of the gear pump enclosing the gears (not discernible from FIG. 1 of the instant drawings) are curved to contour the outer surface of the gears and are spaced so as to have decreasing hydraulic radius in the downstream direction within the gear pump. In this way, the molten thermoplastic material passing through the upper end of the gear pump forms a pool of material above the pair of gears 36 and passes material around the outer gear pair in the space between the gears and the walls to a point of discharge shown schematically as region 40 in FIG. 1 of the instant drawings.

The molten thermoplastic material leaving gear pump 28 then enters a secondary mixer 42 through conduit 52. The secondary mixer 42 can be a conventional mixer which is independently driven and operated by motor 44 which is electrically monitored and controlled (not shown) by conventional techniques to operate with varying speeds responsive to the type of thermoplastic material being processed. The outlet end 46 of gear pump 28 is positioned in a fluid-tight manner i.e., close-coupled to the input end 48 of mixer 42 by means of flange connectors 50 and 51 so that material in the mix leaving the gear pump 28 is discharged without leakage directly into secondary mixer 42 through conduit 52.

As indicated previously, the secondary mixer that can be employed is one which can be conventional in the art such as the type disclosed in U.S. Pat. No. 3,486,192 issued on Dec. 30, 1969 to G. LeRoy the pertinent details of which are incorporated herein by reference. The secondary mixer 42 which is independently driven by motor 44 includes a cylinder 54 which is adapted to be mounted in barrel 56. Cylinder 54 contains a series of substantially longitudinal inlet grooves 58 dead ending in the outlet direction and a series of substantially longitudinal outlet grooves 60 each ending in the inlet direction. A land 62 comprises a barrier between the input and output grooves. Cylinder 54 is preferably rotatably mounted in barrel 56 with inlet grooves 58 being mounted so that they open in the direction of the feed end and outlet grooves 60 open in the direction of the discharge end. Cylinder 54 is also joined to screws 64, 66 in such a manner that the cylinder rotates with and is driven by screws 64 and/or 66. The clearance between land 62 and the inner wall 68 of barrel 56 may vary. The clearance may be readily determined by a person having ordinary skill in the art and may be broadly defined as any clearance that will give a rate of shear commensurate with that required to remove or substantially remove agglomerates, "gels," or "fish eyes" from a thermoplastic resin and/or depolymerize such a resin.

As shown in FIG. 1 of the drawing, secondary mixer 42 can also be provided with a heating/cooling jacket 70 and beating housing 72 containing beating 74 which rotably supports mixing rotor 76. The outlet end 78 of secondary mixer 42 is also positioned in a fluid fight manner i.e., closely coupled to the end 80 of the pelletizing apparatus by means of flange connectors 82 and 83 so that material in the mix leaving the secondary mixer 42 is discharged without leakage directly into the pelletizing system apparatus through conduit 84. Thus, the molten thermoplastic material is then passed through conduit 84 through screen changer means 85 and thence to under-water pelleter means 86 which are well known per se to those skilled in the art. At the discharge end of under-water pelleter means 86 the material is water-borne to the drier system through a hydraulic loop containing pump 88, separator screen 90 and surge tank 92. The fluid passing through the loop flows in the direction shown by the arrows in conduits 94 and 96. The screen 90 separates the conveying liquid (water) from the pelletized thermoplastic material which passes through conduit 98 to a centrifugal drier 100 from whence it is discharged at the outlet location 102 into a bulk material box 104 for storage and transportation.

As mentioned previously, the secondary mixers can also be located upstream of the gear pump and indeed, improved mixing results are also obtained with high-capacity pelletizing systems.

In either the upstream or downstream location, there is provided a controllable amount of additional mixing (extensive and/or intensive), and/or energy to the polymer for gel reduction, particulate distribution and/or dispersion, tailoring, reactive extrusion, etc.

Thus referring to FIG. 2 wherein like parts are represented by like reference numerals, it will be seen that secondary mixer 42 is now close-coupled to melter/mixer 10 by flange members 106 and 51 and secondary mixer 42 is close coupled to the gear pump apparatus by flange members 108 and 82. Gear pump 28 is also close coupled to the pellitizer system through flange 50 and flange 83.

The apparatus of the present invention is suitable for processing various types of synthetic thermoplastic materials such as polyethylene, polypropylene, polyvinyl chloride and co-polymers thereof, poly(ethyleneoxide), polyvinylidine chloride and copolymers thereof poly-4-methyl-1-pentene ethylene/propylene rubbers and the art recognized equivalents thereof.

The apparatus of the present invention is particularly suitable for processing polyethylene resins which are produced in large capacities such as in excess of 25,000 lbs/hr with a melt index (M.I.) range of 300,000:1 or greater.

The operating ranges for the melter/mixer and gear pumps depends upon the type of materials being processed, through-put rates, desired properties and other known consideration.

In general, however, the melter mixer and gear pump can be operated under conventional operating parameters which are well known to those skilled in the art. The secondary mixer can also be operated under conventional parameters since the present invention resides in the particular arrangement of the melter/mixer, gear pump and secondary mixer rather than particular operating modes of each element.

Comparative testing has been carried out employing the system of the present invention which included a four inch, twin-screw melter/mixer, a gear pump and an independently driven secondary mixer, with a low pressure, high density polyethylene which is commercially available. Throughput rates ranged from 380 lbs./hr. to 630 lbs./hr.

The system of the present invention was compared with a conventional one stage mixer (Farrel 4 FCM) and a two stage mixer (Kobe LCM-100). Neither of these systems had an independently controlled secondary mixer operating in the manner of the present invention. The system of the present invention employed a melter/mixer which is item 10 as shown in FIGS. 1 and 2 respectively.

The gear pump was item 28 as shown in FIG. 1 and the secondary mixer was item 42 which was disposed downstream of the gear pump as shown in FIG. 1. The pellets produced under the tests were employed to make film which was analyzed for film appearance ratings (FAR) and which, as is known in the art, is an indirect measurement of the gels and agglomerates in the resin. The data is for the same product to allow a direct system comparison by the single stage mixer, the two stage mixer and the system of the present invention. The following Table I presents the operational data and results.

TABLE I

|  | Farrel 4 FCM | KOBE LCM-100 | 4 FCM with Mixing head Device of Instant Invention |
| --- | --- | --- | --- |
| Feedstock* | DJX-4808H | DJX-4808H | DJX-4808H |
| Rate #/hour | 630 | 630 | 630 |
| FAR | −50 | −30 | +20 |

*DJX-4808H is a grade of granular, high density, low pressure polyethylene of 8 flow index; wherein such grade of polyethylene is a designation assigned by Union Carbide Corporation.

The following Table II present operational data for each system to indicate the effectiveness of the apparatus of the present invention. The materials and equipment utilized were as indicated for the Table I operational data, except that the feed rates were lowered. The results are indicated in Table II below.

TABLE II

|  | Farrel 4 FCM | KOBE LCM-100 | FCM with Mixing head Device of Instant Invention |
| --- | --- | --- | --- |
| Feedstock | DJX-4808H | DJX-4808H | DJX-4808H |
| Rate #/hour | 380 | 380 | 380 |
| FAR | −40 | −10 | +30 |

As can be discerned from an analysis of the data, a two-stage mixer does improve the FAR; however, by utilization of the apparatus of the present invention, the FAR rating is improved to acceptable commercial levels. However, at the same rates, the single stage and the two-stage mixer did not provide films which have acceptable FAR ratings.

We claim:

1. A continuous pelletizing system for pelletizing synthetic thermoplastic materials which comprises:
   (1) a melter/mixer for at least partially melting and mixing synthetic thermoplastic material;
   (2) a gear pump operatively coupled with the melter/mixer for increasing pressurization of the melted synthetic thermoplastic material;
   (3) an independently controlled dispersive mixer operatively coupled with the gear pump or the melter/mixer which provides additional independent mixing of the melted synthetic thermoplastic material; and
   (4) a pelletizer operatively coupled with the independently controlled dispersive mixer or the gear pump for forming pellets of synthetic material.

2. A continuous pelletizing system according to claim 1 wherein the independently controlled dispersive mixer is positioned upstream of said gear pump.

3. A continuous pelletizing system according to claim 1 wherein the independently controlled dispersive mixer is positioned downstream of the gear pump.

4. A continuous pelletizing system according to claim 1 wherein the melter/mixer, the gear pump and the independently controlled dispersive mixer are in a close coupling relationship.

5. A continuous pelletizing system according to claim 4 wherein the close coupling is effected between the discharge of a polymerization reactor of a system through the melter/mixer, gear pump and independently controlled dispersive mixer system.

* * * * *